United States Patent [19]

Akasaki et al.

[11] Patent Number: 4,846,893
[45] Date of Patent: Jul. 11, 1989

[54] PROCESS FOR PRODUCING A SURFACE TREATED PIGMENT

[75] Inventors: Yutaka Akasaki; Naoya Yabuuchi; Tatsuro Ohki, all of Kanagawa, Japan

[73] Assignee: Fuji Xerox Co., Ltd., Tokyo, Japan

[21] Appl. No.: 152,001

[22] Filed: Feb. 3, 1988

[30] Foreign Application Priority Data

Feb. 4, 1987 [JP] Japan .................... 62-22529

[51] Int. Cl.$^4$ .................... C08J 7/04; B05D 7/02
[52] U.S. Cl. .................... 106/500; 427/214; 427/221; 427/407.1; 428/407
[58] Field of Search .................... 106/308 M, 500; 427/214, 221, 407.1; 428/407

[56] References Cited

U.S. PATENT DOCUMENTS

| | | | |
|---|---|---|---|
| 3,291,859 | 12/1966 | Tobolsky | 525/440 |
| 3,945,831 | 3/1976 | Satomura | 522/149 |
| 4,127,422 | 11/1978 | Guzi, Jr. et al. | 106/308 M |
| 4,315,959 | 2/1982 | Brandtsbuys et al. | 106/308 M |

FOREIGN PATENT DOCUMENTS

32415/73 10/1973 Japan .
7648/83 1/1983 Japan .

OTHER PUBLICATIONS

Derwent Abstracts, an 75-11178W/07, "Aqueous Dispersions of Water-Insolo Dyes and Pigment", German Pat. No. DE2336777, 2/6/75.

Derwent Abstracts, AN 86-062537/10, "Reduction of Molecular Weight of Polyacrylic Acids", German Pat. No. DE 3430233, 2/27/86.

Terada and Murashige, (Journal of Colorant Association, vol. 51, pp. 465 to 472 (1978)).

Ohkita et al. (Journal of Colorant Association, vol. 41, p. 187 (1968)).

Furusawa et al. (Kobunshi Ronbunchu, vol. 40, No. 10, pp. 697 to 702 (1983)).

*Primary Examiner*—Paul Lieberman
*Assistant Examiner*—Christine A. Skane
*Attorney, Agent, or Firm*—Finnegan, Henderson, Farabow, Garrett, & Dunner

[57] ABSTRACT

A process for producing a surface treated pigment wherein pigment particles are dispersed in a solution of a water soluble high polymer having radical generation sites to adsorb the water soluble high polymer on the surfaces of the pigment particles, adding a vinyl monomer to the resulting aqueous liquid dispersion of the pigment particles subjected to the adsorption treatment and polymerizing in the presence of a polymerization initiator, if desired, to form a polymer layer on the surfaces of the pigment particles. Formation of the white polymer particles composed only of polymer can be prevented and dispersion stability can be improved.

11 Claims, No Drawings

PROCESS FOR PRODUCING A SURFACE TREATED PIGMENT

FIELD OF THE INVENTION

The present invention relates to a process for producing pigment particles coated with a polymer, particularly a vinyl polymer.

BACKGROUND OF THE INVENTION

Many attempts have been made to improve the pigment dispersibility in a resin such as in paints, electrophotographic developers, inks, etc. For instance, there has been proposed a simple treating method using a coupling agent such as silane or titanate in Japanese Patent Publication No. 32415/73, Japanese Patent Application (OPI) No. 7648/83 (the term "OPI" as used herein means a "published unexamined Japanese patent application), and Terada and Murashige et al (Journal of Colorant Association, Vol. 51, pages 465 to 472 (1978)). Further, there has been proposed (1) a method of grafting a polymer to the surface of carbon black, by Ohkita, et al. (Journal of Colorant Association, Vol. 41, p. 187 (1968)); and a method of coating the surface of inorganic particles (silica) with a polymer (polystyrene) by means of emulsion polymerization, by Furusawa et al. (Kobunshi Ronbunshu, Vol. 40, No. 10, pages 697 to 702 (1983)).

However, although the treatment with the coupling agent may be satisfactory for use in several fields, it cannot be generally applied to a wide range of applications. Further, the method proposed by Ohkita, et al. may contribute to the improvement of the dispersibility in the resin by the polymer grafting, but this involves a drawback in that a satisfactory result cannot be obtained in the case where pigment particles have to be coated completely with the polymer. As another drawback, there has been a problem upon applying the method to various pigments other than carbon black. That is, it is impossible to use the method for treating various kinds of pigments by the polymer of an identical composition (particularly in the color toner pigment). While on the other hand, although polymer-coated particles can be obtained by the method of Furusawa, et al., the method has the drawback that particles comprising only polymer, and not containing inorganic particles, may be also formed. Further, since the stability of the emulsion is not sufficient in this method, it has the drawback that coagulated lumps may be caused partially.

SUMMARY OF THE INVENTION

Accordingly, an object of the present invention is to overcome the foregoing problems in the prior art and to provide a process for producing surface-treated pigment particles in which the surfaces of pigment particles are coated with a desired vinyl polymer.

In view of the foregoing, the present inventors have developed a surface treating method (1) capable of being applied to various kinds of pigments, (2) capable of using a wide range of vinyl monomers and (3) which is excellent in production stability and economical advantage.

The foregoing object and advantages of the present invention can be attained by a process for producing a surface treated pigment which comprises a first step of dispersing pigment particles in a solution of a water soluble high polymer having radical-generation sites so as to adsorb said high polymer on the surfaces of the pigment particles and a second step of adding a vinyl monomer to the resulting aqueous dispersion of the pigment particles having the high polymer adsorbed thereon and subjecting the resulting mixture to polymerization conditions to form a polymer layer on the surface of the pigment particles. If desired, the polymerization may be conducted in the presence of a polymerization initiator.

DETAILED DESCRIPTION OF THE INVENTION

The present invention is described more specifically hereinbelow.

In the first step, according to the present invention, the water soluble high polymer having radical-generation sites is adsorbed on the surface of the pigment particles.

Various kinds of pigments can be used, and the pigments which may be used in the practice of the present invention include, for example, carbon black, azo-pigment, phthalocyanine pigment, thioindigo pigment, anthraquinone pigment, flavanthrone pigment, indanthrene pigment, anthrapyridine pigment, pyranthrone pigment, perylene pigment, perynone pigment and quinacridone pigment.

The term "water soluble high polymer having radicalgeneration sites" as used herein means those water soluble high polymers having mercapto groups in the molecular chain (main chain or side chain) or at the terminals of the molecular chain constituting the high polymer, or those water soluble high polymers having introduced structures in a state where an azo polymerization initiator or a peroxide polymerization initiator is chemically bonded.

The water soluble high polymer with radical-generation sites can include, for example, polyvinyl alcohol, hydroxyethyl cellulose, hydroxypropyl cellulose, carboxymethyl cellulose and polyacrylic acid. For introducing the radical-generation sites into these water soluble high polymers, there can be utilized, for example, (1) a method of introducing such sites by chemical reaction between the water soluble high polymer and an azo or peroxide polymerization initiator, (2) a method of incorporating such sites in the main chain by using an azo or peroxide polymerization initiator having a polymerizable double bond as a comonomer upon synthesis of the water soluble high polymer and (3) a method of introducing mercapto groups in the main chain and/or at the terminal end of the high molecular chain upon synthesizing the water soluble high polymer. The azo or peroxide polymerization initiator usable in such a method can include, for example:

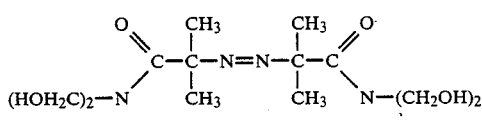

(VA-080: manufactured by Wako Junyaku Co., Ltd.)

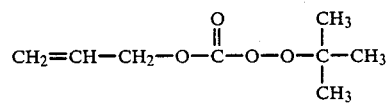

-continued
(Peroma-AC: manufactured by Nippon Oils & Fats Co., Ltd.)

2,2'-Azobis[2-methyl-N—(2-hydroxyethyl) Propionamide]

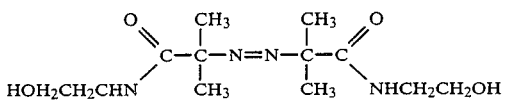

(M.W. = 288.34) (manufactured by Wako Junyaku Co., Ltd.)

2,2'-Azobis(N,N'—dimethyleneisobutyramidine)

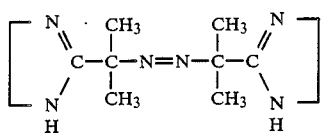

4,4'-Azobis(4-cyano-pentanoic acid)

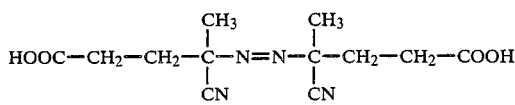

Specific examples of water soluble high polymers having the radical-generation sites obtained by the method as described above are, for example, those linear polymers in which the following structural units are arranged at random:

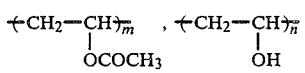  (1)

(containing SH bonds at the terminal)

m + n = 50 to 5000

$$\frac{n}{m+n} \times 100 = 99 - 60$$

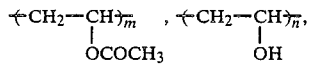  (2)

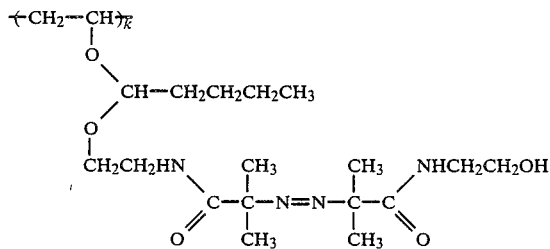

m + n + k = 50 to 5000

$$\frac{n}{m+n+k} \times 100 = 99 \text{ to } 60, \text{ and}$$

$$\frac{k}{m+n+k} \times 100 = 0.1 \text{ to } 5.0$$

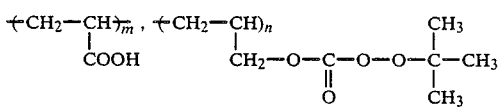  (3)

-continued
m + n = 50 to 5000, and $$\frac{n}{m+n} \times 100 = 1.0 \text{ to } 25.0$$

The first step in the present invention is carried out by adding or dispersing a pigment in an aqueous solution of a water soluble high polymer having radical-generation sites. The dispersion can be conducted by using a ball mill, homogenizer, or the like. In this case, a known activator may also be used as a pigment dispersion aid. The dispersion aid can include, for example, with no particular restriction, a naphthalene sulfonic acid-formalin condensate, a styrene-maleic acid copolymerized oligomer, or the like.

In the present invention, it is sometimes desirable that the water soluble high polymer had a cloud point (i.e., a temperature which a solubility of the polymer is decreased by raised temperature, and thereby is separated as phase and is deposited). That is, when the temperature increases so as to exceed the cloud point upon pigment dispersion, the water soluble high polymer is deposited on the surrounding pigment particles to increase the thickness of the adsorbed layer thereby increasing the dispersion stability and contributing to the prevention of coagulation. The cloud point is preferably from 30° to 60° C. and more preferably from 35° to 55° C.

After the adsorbing treatment, unadsorbed water soluble high polymer is removed for controlling the formation of white latex. Ultra-filtration, dialysis, or the like is used to remove the water soluble high polymer.

In the second step of the present invention, the vinyl monomer which is adsorbed on the surface of the treated pigment is polymerized at a reaction temperature of 45° to 95° C. in the presence of an inactive gas such as a nitrogen gas.

The vinyl monomer usable in the practice of the present invention can include with no particular restriction, for example, vinyl aromatic compounds such as styrene, 2-methylstyrene, p-methylstyrene, p-tert-butylstyrene, p-methoxystyrene, p-phenylstyrene, 3,4-dichlorostyrene, (metha)acrylic acid esters such as methylacrylate, ethylacrylate, n-butylacrylate, isobutylacrylate, propylacrylate, n-octylacrylate, dodecylacrylate, 2-ethylhexylacrylate, stearylacrylate, 2-chloroethylacrylate, phenylacrylate, methyl-α-chloroacrylate, methyl methacrylate, ethyl methacrylate, propyl methacrylate, n-butyl methacrylate, isobutyl methacrylate, n-octyl methacrylate, dodecyl methacrylate, 2-chloroethyl methacrylate, stearyl methacrylate, phenyl methacrylate, dimethylaminoethyl methacrylate, diethylaminoethyl methacrylate, vinyl cyan compounds, N-substituted maleimide derivatives, conjugated diolefines such as a halogenated vinyl compound, butadiene and isoprene, and the like. A single vinyl monomer may be used or a mixture of two or more vinyl monomers may be used. It is desirable to use an amphiphatic vinyl monomer soluble in both water and a non-polar solvent as a copolymerizing monomer. While there are various amphiphatic vinyl monomers which may be used, N-vinyl pyrrolidone is most preferred. Further, a vinyl monomer containing fluorine or silicon may be used as the copolymerizable monomer and, since these monomers are compounds having a low surface tension, they can contribute to the dispersion stability during polymerization. Such monomer can include, specifically, trifluoromethylmethacrylate and polydimethyl siloxane macromer shown by the following structural formula:

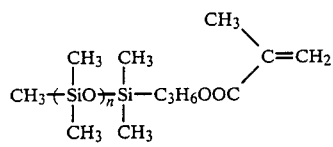

(n = 0 to 150, and preferably 1 to 100)

The polymerization is conducted by adding the vinyl monomer to the aqueous dispersion containing the pigment particles treated in the first step and subjecting the resulting mixture to polymerization conditions to form a polymer layer on the surfaces of the pigment particles. In this case, the polymerization takes place starting from the radical-generation sites of the water soluble high polymer adsorbed to the surface of the pigment particles. Since the polymerization is stopped when all of the radical-generation sites are exhausted, it is desirable to conduct polymerization of the remaining vinyl monomer or newly supplemented vinyl monomer in order to increase the layer thickness of the polymer for coating the surface of the pigment particles. For this purpose, an usual water soluble polymerization initiator, for example, potassium persulfate, hydrogen peroxide, azobiscyanovaleric acid, and ammonium persulfate may be used, if desired, or oil-soluble polymerization initiator, for example, lauroyl peroxide, cyclohexanone peroxide, toluoyl peroxide, azobisdimethylvaleronitrile, benzoyl peroxide, trimethylhexanoyl peroxide, and azobisisobutyronitrile may be dissolved in the monomer.

Further, for improving the dispersion stability during polymerization, a dispersion aid may also be used. However, it is desirable that the dispersion aid has a weak emulsifying effect and has a high enough surface tension (preferably 60 dyn/cm or more) so as to prevent the formation of white latex due to the polymerization of only the vinyl monomer. An example of preferred dispersion aid is a naphthalene sulfonic acid formalin condensate.

After the completion of the polymerization reaction, the water soluble high polymer transferred to the polymer layer formed on the surface of pigment particles is separated from the dispersion aid used in the process and then purified. Most typically, the particles are subjected to ultrafiltration or dialysis after the purification, and the pigment dispersion is purified in the state of latex or after solid-liquid separation and then dried, depending on the application use.

EXAMPLES

The present invention is further described referring to the following examples.

Example 1

| | |
|---|---|
| Polyvinyl alcohol introduced with mercapto groups at the terminal end of molecular chain (X-6509-3203: manufactured by Kuraray Co., Ltd.) | 100 g |
| Dispersion aid: Demole-N (manufactured by Kao Soap Co., Ltd.) | 15 g |

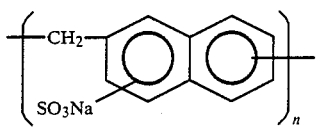

| | |
|---|---|
| n = 3 to 4 | |
| Glutaraldehyde (crosslinker) | 0.9 g |
| Distilled water | 900 g |

The foregoing ingredients were mixed to prepare an aqueous solution. 100 g of carbon black (R33OR: manufactured by Cabot Co.) was added to the aqueous solution, and then agitated and homogenized by an ultradisperser LK-41 (manufactured by Yamato Kagaku Co., Ltd.) for about five minutes. Then, while continuing the agitation, 50 ml of 0.1N HCl was dropped for about 10 minutes and the agitation was further continued for five minutes. When the portion of the resultant pigment dispersion was sampled and observed by scanning electronmicroscope, no pigment coagulation was observed at all and it could be confirmed that a satisfactory dispersed state was maintained. Then a portion of the liquid dispersion was centrifugally separated and the amount of polyvinyl alcohol in the aqueous phase (not-adsorbed polyvinyl alcohol) was determined. It was found that about 80 wt % thereof remained in the water phase and the residual 20 wt % was adsorbed to the pigment.

For removing the un-adsorbed polyvinyl alcohol, the dispersion was treated with ultrafiltration machine UFP-2 (manufactured by Mitsui Petrochemical Industries, Ltd.) and dilution and concentration were repeated (using about 30 liters of distilled water). Finally, the volume of the pigment liquid dispersion was set at two liters and the pH was adjusted to pH 4 with 1N HCl.

An aqueous solution comprising 15 g of Demole-N and 200 ml of distilled water was added to the resultant-pigment liquid dispersion and agitated with the ultradisperser as described above.

The resultant liquid pigment dispersion was placed in a three liter volume separable glass flask equipped with a stirring blade (i.e., an agitating element), a nitrogen gas introducing port, a monomer introducing port and a temperature controller and the temperature was raised to 60° C.

Additionally, the following solutions were prepared.

| | |
|---|---|
| Solution (I) | |
| KBrO₃ | 2.5 g |
| Distilled water | 200 ml |
| N—vinyl pyrrolidone | 40 g |
| Solution (II) | |
| Styrene monomer | 50 g |
| FM-0711 (polydimethyl siloxane macromer: manufactured by Chisso Corporation) | 5 g |

The entire amount of the solution (I) was added at the instant where the internal temperature of the flask reached 60° C. and then the solution (II) was dropped by using a dropping funnel for about one hour. After the elapsed time of two hours, a 20 ml aqueous solution containing 1.0 g of water soluble polymerization initiator (VA-080: manufactured by Wako Junyaku Co., Ltd.) was added to the reaction mixture and polymerization was continued at 75° C. for 48 hours. After the completion of the polymerization, the product was passed through a 200 mesh screen (i.e. 0.074 mm) to remove coagulated blocks. The amount of the separated coagulated blocks was 3 to 4 wt % of the entire amount and it was confirmed that the polymerization had proceeded relatively stably.

For purifying the resultant black latex, dilution and concentration were repeated by using an ultrafiltration machine. When the filtrate ingredients were analyzed, polyvinyl pyrrolidone, polyvinyl alcohol, and Demole-N were detected. Based on the calculation from the solution concentration, it was deduced that most of the polyvinyl pyrrolidone and the polyvinyl alcohol had been transferred to the latex particle/aqueous phase boundary and acted as the dispersion stabilizer.

After the completion of the purification, a portion of the latex was freeze-dried, and then subjected to elementary analysis, observation by the transmission type electron microscope and thermogravimetric analysis. When calculated from the values for the elementary analysis, it was found that the nitrogen content was low and polyvinyl pyrrolidone taken into the polymer layer on the pigment particles was 5 wt % or less based on the charged amount. Further, it was found by the observation using the transmission type electronmicroscope that the pigment particles were covered with the polymer. Furthermore, from the result of the thermogravimetric analysis, it was found that the weight ratio of pigment/polymer was 63/37.

Example 2

The same procedures were repeated as in Example 1, except for using cyanine blue GN-0 (manufactured by Sumika Color Co., Ltd.) instead of carbon black to obtain surface treated pigment. When analyzed in the same manner as in Example 1, it was confirmed that the surface of the resultant pigment particles was coated with the polymer.

Example 3

The same procedures were repeated as in Example 1, except for using Carmine 6BC (manufactured by Sumika Color Co., Ltd.) instead of carbon black to obtain surface treated pigment. When analyzed in the same manner as in Example 1, it was confirmed that the surface of the resultant pigment particles was coated with the polymer.

Example 4

The same procedures were repeated as in Example 1, except for using pigment yellow (manufactured by Sumika Color Co., Ltd.) instead of carbon black to obtain surface treated pigment. When analyzed in the same manner as in Example 1, it was confirmed that the surface of the resultant pigment particles was coated with the polymer.

Comparative Example 1

The same procedures as in Example 1 were repeated except for using polyvinyl alcohol 420H not containing mercapto groups (manufactured by Kuraray Co., Ltd.) instead of polyvinyl alcohol X-6509-3203. However, the polymerization was conducted without using KBrO₃ (since mercapto group is not present) and using only the polymerization initiator VA-080. However, while latex was formed in a great amount from the initial stage of the polymerization and no satisfactory result could be obtained.

Example 5

Carbon black was treated by the same procedures as in Example 1 except for using 35 g of methylmethacrylate and 15 g of n-butylmethacrylate instead of 50 g of styrene monomer as in Example 1. A considerably stable latex was obtained after four hours of polymerization time. The result of the analysis was substantially the same as that in Example 4. The weight ratio of carbon black/polymer was 62/38.

As is apparent from the results described above, since the pigment particles are treated by using the water soluble polymer having radical-generation sites in the first step a described above, formation of white polymer particles only composed of polymer can be prevented and the dispersion stability can be improved upon successive polymerization of the vinyl monomer. Further, since the present invention can be applied to various kinds of pigments and the vinyl monomers used can be selected from the wide range, the thus obtained surface treated pigments have a wide range of applications, for example, as electrophotographic developers, electrophotographic photosensitive materials, liquid developers, image forming materials such as ink for use in ink jet, medical materials such as latex for use in clinical tests, or paints.

Particularly, in the case of applying the present invention to the production of an electrophotographic developer, the pigment dispersibility of the color toner can be improved and the amount of electric charge can be unified with every color.

While the invention has been described in detail and with reference to specific embodiments thereof, it will be apparent to one skilled in the art that various changes and modifications can be made therein without departing from the spirit and scope thereof.

What is claimed is:

1. A process for producing a surface treated pigment which process comprises (a) a first step of dispersing pigment particles in an aqueous solution of a water soluble high polymer, said high polymer having radical generation sites provided by (1) mercapto groups in the molecular chain or at the terminals of the molecular chain constituting said high polymer or (2) introduced structures where an azo polymerization initiator or a peroxide polymerization initiator is chemically bonded to said high polymer, to obtain pigment particles having said high polymer adsorbed on the surfaces of the pigment particles, and (b) a second step of adding a vinyl monomer to the resulting aqueous dispersion containing said pigment particles having said high polymer adsorbed on the surfaces thereof and subjecting the resulting mixture to polymerization conditions so that polymerization is started from said radical generation sites to obtain a polymer layer on the surfaces of the pigment particles.

2. The process for producing a surface treated pigment as claimed in claim 1, wherein said radical generation sites are provided in said water soluble high polymer by (a) chemical reaction between said water soluble high polymer and an azo or peroxide polymerization initiator, (b) incorporating said sites in the main chain of said high polymer by using an azo or peroxide polymerization initiator having a polymerizable double bond as a comonomer or (c) introducing mercapto groups at least at the terminal ends of the main chain of said high polymer.

3. The process for producing a surface treated pigment as claimed in claim 1, wherein in said first step the solubility of said water soluble high polymer in said solution decreases at a temperature of from 30° to 60° C. and said high polymer separates as a phase and deposits on surrounding pigment particles, and wherein said first step further includes heating said aqueous solution to a temperature exceeding the temperature at which said solubility decreases.

4. The process for producing a surface treated pigment as claimed in claim 1, wherein the vinyl monomer includes an amphiphatic vinyl monomer soluble both in water and a nonpolar solvent.

5. The process for producing a surface treated pigment as claimed in claim 4, wherein the amphiphatic vinyl monomers is N-vinyl pyrrolidone.

6. The process for producing a surface treated pigment as claimed in claim 1, the second step further includes conducting said polymerization in the presence of a polymerization initiator.

7. The process for producing a surface treated pigment as claimed in claim 1, wherein said water soluble high polymer is selected from the group consisting of polyvinyl alcohol, hydroxyethyl cellulose, hydroxypropyl cellulose and polyacrylic acid.

8. The process for producing a surface treated pigment as claimed in claim 1, wherein said vinyl monomer includes a monomer selected from the group consisting of vinyl aromatic compounds, (Metha)acrylic acid esters, vinyl cyan compounds, N-substituted maleimide derivatives, and conjugated diolefines.

9. The process for producing a surface treated pigment as claimed in claim 1, wherein said vinyl monomer includes a vinyl monomer containing fluorine or silicon.

10. The process for producing a surface treated pigment as claimed in claim 9, wherein said vinyl monomer includes trifluoromethyl-methacrylate or polymethyl siloxane macromer represented by the following structural formula:

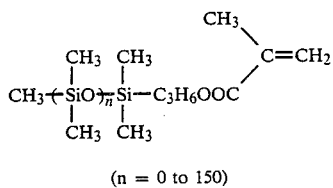

(n = 0 to 150)

11. The process for producing a surface treated pigment as claimed in claim 1, the second step further includes conducting said polymerization in the presence of a dispersion aid.

* * * * *